United States Patent
Sanneck et al.

(10) Patent No.: US 10,367,690 B2
(45) Date of Patent: Jul. 30, 2019

(54) VERIFICATION IN SELF-ORGANIZING NETWORKS

(71) Applicant: NOKIA SOLUTIONS AND NETWORKS OY, Espoo (FI)

(72) Inventors: Henning Sanneck, Munich (DE); Tsvetko Ivanchev Tsvetkov, Garching (DE); Szabolcs Novaczki, Budapest (HU)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 15/307,684

(22) PCT Filed: Apr. 30, 2014

(86) PCT No.: PCT/EP2014/058837
§ 371 (c)(1),
(2) Date: Oct. 28, 2016

(87) PCT Pub. No.: WO2015/165525
PCT Pub. Date: Nov. 5, 2015

(65) Prior Publication Data
US 2017/0063621 A1    Mar. 2, 2017

(51) Int. Cl.
| | | |
|---|---|---|
| G01R 31/08 | (2006.01) |
| H04L 12/24 | (2006.01) |
| H04W 24/02 | (2009.01) |
| H04W 24/08 | (2009.01) |
| H04W 84/18 | (2009.01) |

(52) U.S. Cl.
CPC ...... *H04L 41/0823* (2013.01); *H04L 41/0813* (2013.01); *H04L 41/0886* (2013.01); *H04L 41/142* (2013.01); *H04W 24/02* (2013.01); *H04W 24/08* (2013.01); *H04L 41/16* (2013.01); *H04W 84/18* (2013.01)

(58) Field of Classification Search
CPC .................................................. H04L 41/0823
See application file for complete search history.

(56) References Cited

U.S. PATENT DOCUMENTS

| | | | |
|---|---|---|---|
| 9,526,091 B2 * | 12/2016 | Chou | H04W 28/0268 |
| 2011/0009105 A1 * | 1/2011 | Lee | H01Q 9/0407 |
| | | | 455/418 |

(Continued)

FOREIGN PATENT DOCUMENTS

| | | |
|---|---|---|
| EP | 2 453 691 A1 | 5/2012 |
| WO | 2014/023347 A1 | 2/2014 |
| WO | 2014/198310 A1 | 12/2014 |

OTHER PUBLICATIONS

International Search Report for corresponding International Patent Application No. PCT/EP2014/058837, dated Jan. 23, 2015.

(Continued)

*Primary Examiner* — Gerald A Smarth
(74) *Attorney, Agent, or Firm* — Squire Patton Boggs (US) LLP

(57) ABSTRACT

It is proposed a method of operating a network by a SON Verification Function (20), monitoring a network behavior and verifying a change in network based on the monitored network behavior. The SON Verification Function performs a post-action verification of CM changes and may request from a SON coordinator to undo CM changes.

16 Claims, 11 Drawing Sheets

(56) References Cited

U.S. PATENT DOCUMENTS

| | | | | |
|---|---|---|---|---|
| 2012/0307697 A1* | 12/2012 | Mukhopadhyay | .... | H04W 24/02 370/311 |
| 2013/0217435 A1* | 8/2013 | Tarraf | .......... | H04W 24/02 455/552.1 |
| 2013/0324076 A1 | 12/2013 | Harrang | | |
| 2013/0331079 A1* | 12/2013 | Racz | .......... | H04W 24/02 455/418 |
| 2014/0040450 A1* | 2/2014 | Sanneck | .......... | H04L 41/04 709/223 |

OTHER PUBLICATIONS

Jemaa, et al.; "D5.1 SEMAFOUR Integrated SON Management Requirements and Basic Concepts", Dec. 13, 2013, XP055158831, Retrieved from the Internet: URL:http://fp7-semafour.eu/media/cms_page_media/10/SEMAFOUR_D5.1_IntegratedSONManagement_Basics_Requirements_v1.0.pdf, 50 pages.

Iacoboaiea, et al.: "SON Coordination for parameter conflict resolution: A reinforcement learning framework", 2014 IEEE Wireless Communications and Networking Conference Workshops (WCNCW), IEEE, Apr. 6, 2014, XP032668351, pp. 196-201.

3GPP TR 36.902 V9.3.1 (Mar. 2011); 3rd Generation Partnership Project; Technical Specification Group Radio Access Network; Evolved Universal Terrestrial Radio Access Network (E-UTRAN); Self-configuring and self-optimizing network (SON) use cases and solutions (Release 9).

Seppo Hmalainen et al; "LTE-Self Organising Networks (SON)—Network Management Automation for Operational Efficiency"; Wiley 2012.

Tobias Bandh; "Coordination of Autonomic Function Execution in Self-Organizing Networks"; Network Architectures and Services; Apr. 2013; Technische Universtät München (TUM); 252 pages.

Raphael Romeikat et al; "Efficient, Dynamic Coordination of Request Batches in C-SON Systems"; IEEE International Workshop on Self-Organising Networks; Dresden, Germany, Jun. 2013.

Tobias Bandh et al; "An Experimental System for SON Function Coordination"; International Workshop on Self-Organizing Networks (IWSON 2011); Budapest, Hungary, May 2011.

Ericsson White Paper; "Transparent Network Performance Verification for LTE Rollouts"; Sep. 2012, 12 pages.

Varun Chandola et al; "Anomaly Detection: A Survey"; ACM Computing Surveys (CSUR); vol. 41, pp. 15:1-15:58; Jul. 2009.

Lars Christoph Schmelz et al; "A Coordination Framework for Self-Organisation in LTE Networks"; 12th IFIP/IEEE International Symposium on Integrated Network Management 2011; pp. 193-200.

* cited by examiner

| SON Function | Impact Area (Scope) | Activity Scheme | Data Input | CM Parameter Change |
|---|---|---|---|---|
| Typical SON Function | Defined by the Function-Area, Input-Area, Effect-Area and Safety-Margin | On demand, timed, continuous | All PM / FM data, CM parameters related to the function | CM parameters related to the function |
| SON Verification Function | | | All CM / PM / FM | All CM parameters |

| | Anomaly Detection | Diagnosis | Impact Area Management |
|---|---|---|---|
| SON Verification Function | Based on the result of KPI / PI aggregation. Done by the algorithm part of the function. | Takes the last CM changes into account | Defined at design time. |
| DDIA Extended SON Verification Function | | Takes CM changes made in the past into account. Identifies the SON function which has triggered a CM change | Triggered by a CM change. Verification impact area dynamically specified. Informs the SON coordinator about the verification impact area |

Fig. 17

VERIFICATION IN SELF-ORGANIZING NETWORKS

FIELD OF INVENTION

The present invention relates to communication systems, especially to Self-Organizing Networks (SONs). In particular the present invention relates to a method of operating a network by a SON Verification Function, to a SON Verification Function, to a network system and to a computer-readable medium.

BACKGROUND

Self-Organizing Networks are seen today as a key enabler for automated network management in next generation mobile communication networks such as LTE and LTE-Advanced. SON areas include self-configuration, self-optimization and self-healing. The first area typically focuses on the initial configuration and auto-connectivity of newly deployed Network Elements (NEs). The second area targets the optimal operation of the network. A network enabled for self-optimization automatically adapts network parameters which should lead to improved robustness, reliability and throughput. The third area, self-healing, is responsible for fault detection and resolution caused by malfunctioning hardware or faulty software.

These three core functionalities are available through the use of so-called SON functions. Such functions are designed to work independently from each other. In order to fulfill their tasks they monitor certain Key Performance Indicators (KPIs), configuration changes and alarm occurrences in the network. After gathering the required amount of information, a SON function instance may get active (i.e., run its algorithm) in order to compute new Configuration Management (CM) parameters and enforce them on the NEs requiring reconfiguration.

These three core functionalities, however, may be implemented by SON functions 10, which are designed to work independently from each other. They comprise three major parts, illustrated in FIG. 1:

(1) a monitoring phase,
(2) an algorithm execution phase, and
(3) an action execution phase.

During the monitoring phase a SON function instance observes certain Key Performance Indicators (KPIs) and collects information about the network such as configuration changes and fault occurrences. After gathering the required amount of information, the algorithm part of a SON function instance may get triggered. Its purpose is to compute new Configuration Management (CM) parameters which will be applied during the action execution phase.

Furthermore, there are three "activity schemes" of how a SON function monitors the network.

(1) The first one is the "on demand" scheme in which the monitoring part receives an explicit triggering event, such as an alarm notification.

(2) The second one is the "timed" scheme whose primary feature is to trigger the monitoring part at certain points in time (e.g. fixed time intervals).

(3) The last scheme is "continuous" which may require the monitoring phase of a SON function to be always active and evaluate available data.

Since SON function instances may perform changes to network configuration parameters during their operation, a SON coordinator, may be required to reject the requests which would cause or engage in conflicts and allow those which would guarantee a flawless network operation. These approved configuration requests will trigger the actual configuration of their corresponding network parameters. This type of coordination is usually referred to as pre-action SON coordination and is based on rules used to anticipate and avoid known conflicts between SON function instances.

Furthermore, the coordination logic itself is split into two schemes: algorithm and action coordination. The latter one is the most obvious Way of coordinating SON functions since actions show the greatest conflict potential. Since action execution requests typically contain the new configuration parameters, the coordinator is able to compare them with the current configuration or with one made at a previous point in time. The algorithm coordination, on the other side, allows decisions to be taken before the algorithm execution is triggered, i.e. at the earliest possible point in time. Such an early information acquisition can further contribute for preventing the blocking of high priority long-running SON function instances by such having a low-priority and short computation time.

Due to the fact that SON function instances may perform changes to network configuration parameters during their operation, a SON coordinator is required to reject the requests which would cause or engage in conflicts and allow those, which would guarantee a flawless network operation. These approved requests will trigger the actual configuration of their corresponding network parameters. This type of coordination is usually referred to as pre-action SON coordination and is based on rules used to anticipate and avoid known conflicts between SON function instances.

In addition, there are at least two properties of a SON function instance which may be required for coordination: the impact time and impact area. A SON function instance should be considered by a SON coordinator during the complete time period during which it is active. This time period consist mainly of the impact time. This time period includes not only the delay required to perform measurements, run the algorithm and compute new configuration parameters, but also the time required to deploy the new configurations and the time until they become relevant for subsequently active functions.

The impact area on the other side is the spatial scope within which a SON function instance modifies configuration parameters or takes measurements. More precisely, it contains the function area (area that is directly configured), the input area (area where the measurements are taken from), the effect area (the area that contains the NES that are affected by a CM change) and the safety margin (an extension to the effect area).

The impact area provides information, allowing the detection of conflicting SON function instances. To turn a potential SON function conflict into an actual conflict, the potentially conflicting SON function instances have to have an overlapping impact area. The impact area itself is defined at design time of a SON function and is used at run time by the SON coordinator.

However, approved network configuration changes may not necessarily lead to improved performance targeted by the corresponding network functions and, even more so for the network-wide performance defined by operator specific criteria. It is caused by the fact that the SON coordinator focuses only on the conflict detection and coordination. An operator may, therefore, compensate this by adding a post-action verification mechanism to determine whether a configuration change leads to a significant change in performance. It aims at computing statistical measures on performance indicators at a relevant spatial and temporal aggregation level to assess quickly the impact of a set of (SON-induced) configuration changes. This is done independently of the semantics of those configuration changes such that also performance impacts with unknown causes can be identified. The approach can be classified as a specific type of anomaly detection.

Complementary to the coordination strategy, is a post-action SON verification mechanism. It aims at computing statistical measures on performance indicators at a relevant spatial and temporal aggregation level to assess quickly the impact of a set of (SON-induced) configuration changes. This is done independently of the semantics of those configuration changes such that also performance impacts with unknown causes can be identified. The approach can be classified as a specific type of anomaly detection.

In the following, it is distinguished between a "CM undo" and a "CM rollback" with the following definitions: a CM undo reverts all or a subset of CM parameters after they have been enforced on the corresponding Network Elements (NEs). A CM rollback on the other side is a technique implemented by the SON coordinator. The coordinator may buffer CM change request, try to detect potential conflicts between the buffered requests and NACK those preventing a flawless network operation. Thus, a CM rollback is performed before the corresponding changes are propagated to the NEs.

Approved network configuration changes may not necessarily lead to improved performance targeted by the corresponding network functions and, even more so for the network-wide performance defined by operator specific criteria. This is caused by the fact that the SON coordinator can only take into account potential conflict situation known are priori and usually does not have any knowledge on factors beyond the SON function instances, like alarms on certain cells, let alone external conditions not visible at all in the network data (e.g., a special event condition or an external interferer). An operator may therefore compensate this by adding a post-action verification mechanism to determine whether a (set of) configuration action(s) really leads to improvement or not. This mechanism may include the execution of a pre-defined verification plan and may require a training phase, needed for performance degradation detection. In addition to the detection of "degradations", it is also relevant to verify the proper operation of the network, i.e. no change/no degradation or to provide proof of an improvement in the network performance. This applies to all terms of "degradation" in the present content.

Should an undesired network state be detected, the verification mechanism will try to diagnose it, i.e., identify the CM changes (acknowledged earlier by the SON coordinator) which caused the undesired state and take an action (e.g., reverting the changes, escalation to a human operator). This leads to a generic structure 11, as illustrated in FIG. 2.

In FIG. 2 the verification algorithm analyzes CM, PM and FM data in order to detect performance degradation. As soon as enough data is collected, the algorithm determines the affected NEs, performs a CM and FM history search and assembles a new configuration. This new configuration includes CM settings made at a previous point in time. Then, the computed CM parameters are enforced on the corresponding NEs, i.e. a CM undo has been carried out.

Consequently, a workflow may be present that resembles the one of a SON function. As shown in FIG. 3 the phase during which the required information is collected can be represented as a monitoring phase 12 of a SON function 10. Furthermore, a verification algorithm or verification procedure and a CM undo or an CM undo functionality can be represented as an algorithm execution 13 and an action execution phase 14, respectively.

However, having such a SON verification function immediately raises the question about its coordination. A SON function that is not properly coordinated may lead to configuration conflicts, undesired network behavior and performance drops. A main cause for this to happen may be that the verification algorithm is allowed to gather information at any time without consulting the SON coordinator. In the time between starting the algorithm and enforcing the computed CM changes on the NEs, SON functions may get active and be acknowledged to perform their changes. As a consequence, the verification algorithm will have an inaccurate view of the network and inappropriate decisions may be taken. This is the first problem that this invention tends to solve.

Another problem that needs to be addressed is highly connected with the fact that SON functions are intended to work independently from each other since they may be developed by different vendors. Since a SON function may not only be stateless, but also stateful, one may extend it with verification capabilities. A function may track its own CM changes and request an old configuration when necessary. In other words, a SON function following this strategy would try to verify whether its previously computed configuration leads to the desired effect and would perform the required changes otherwise.

FIG. 4 illustrates exemplary coordination principles 15. As soon as the monitoring phase 12 completes, SON function 1 and SON function 2 will ask the coordinator 16 for algorithm execution permission 17. The outcome of the algorithm execution 17 or algorithm computation may be a new or an old configuration which will be applied only if a function's action execution request is granted. This, however, leads to the problem that SON functions are not able to correctly determine if exactly their own change has led to an undesired behavior. Since SON functions do not exchange context information, they are not capable of identifying the function that has caused a problem.

SUMMARY

There may be a need for an improved SON coordination concept.

This need may be met by a method of operating a network, a network system and a computer readable medium according to the independent claims. Further embodiments are described by the dependent claims.

In particular, this need may be met by utilizing a SON Verification Function. In general, it is proposed to combine the SON coordination and verification approaches in order to solve the problems.

It is provided a method of operating a network by a SON Verification Function comprising monitoring of a network behaviour and verifying a change in the network based on the monitored network behaviour.

The method may be performed by a special SON Function, which is a SON Verification Function. The monitoring of the network behaviour may include monitoring performance information of the network, which may be Key Performance Indicators. For verifying a change in the network based on the monitored network behaviour CM data may be compared. This could include monitoring a current CM setup and one or more CM setup made in the past.

According to an exemplary embodiment of the present invention the method may further comprise observing a performance in the network and performing an undo mechanism. A maintained and/or improved performance may be verifiable. The performance may be a degradation. The actual degradation can be observed via PM. FM is a "binary" indicator (alarm) which can point to a degradation. Finally analysis of CM parameters/CM history can contribute on the analysis of the cause for the degradation.

According to an exemplary embodiment of the present invention the method may further comprise applying Configuration Management parameters during blocking other functionalities in the network.

According to an exemplary embodiment of the present invention the method may further comprise accessing Configuration Management data and/or Performance Management data and/or Fault Management data.

According to an exemplary embodiment of the present invention the method may further comprise changing Configuration Management data. An analyse may be performed based on Configuration Management data and/or Performance Management data and/or Fault Management data. The Configuration Management data may be utilized to reconfigure the network.

According to an exemplary embodiment of the present invention the method may further comprise providing a training for the SON Function. This training may include learning from past network configurations. The training may include the performance and alarm situation. The actual learning may be done on the Performance Management data, but the relation to Configuration Management data and Fault Management data can also be learned.

According to an exemplary embodiment of the present invention the method may further comprise determining the degradation in a defined area of the network and determining a SON function which has initiated the degradation. An observed impact area may be for example a cell of the network. The defined area may be an impact area. A determination of a degradation in an impact may be possible by observing parameter modifications. The SON Verification Function may identify another SON function which has triggered a CM change. This SON function may be of lower hierarchy compared to the observing SON Verification Function.

According to an exemplary embodiment of the present invention the method may further comprise accessing Configuration Management history data.

According to an exemplary embodiment of the present invention the method may further comprise providing a measure, which pre-defines a degradation. This measure may a statistical measure or may be a threshold. The measure may be changed from time to time, for example based observations from the past. A training may be used to learn such measures or thresholds for specific KPIs such that a human does not have to set explicit thresholds.

According to an exemplary embodiment of the present invention the method may further comprise collecting performance information of a plurality of cells, and providing a Performance Indicator pattern for the cells.

According to an aspect of the present invention there may be provided a SON Verification Function, which is adapted to perform a method according to the present invention.

According to an aspect of the present invention there may be provided a network system comprising a plurality of SON Functions, wherein at least one of the plurality of SON Functions may be a SON Verification Function, which is adapted to perform a method according to the present invention.

According to an exemplary embodiment of the present invention the SON Verification Function may have a higher hierarchy compared to the further SON Functions. A higher hierarchy may include that the SON Verification Function has more knowledge about changes in the network than other SON functions and more rights to perform changes in the network. In particular the SON Verification Function may have the right to block changes, especially concurrent changes, from other SON functions, which can be performed directly or via a SON coordinator.

According to an exemplary embodiment of the present invention the SON Verification Function may comprise an Undo functionality. With this Undo functionality a status in the network may be recovered in case a degradation has occurred.

According to an exemplary embodiment of the present invention the SON Verification Function may comprise a Diagnoser.

According to an exemplary embodiment of the present invention the SON Verification Function may comprise an interface for connecting with a SON Coordinator.

According to an exemplary embodiment of the present invention the SON Coordinator may comprise a Verification Impact Area Interpreter.

According to an exemplary embodiment of the present invention at least one of the SON Functions may comprise an interface for connecting with a SFIO storage (SFIO: SON Function ID and Objective). The interface may be provided by a SFIO Module and the SFIO storage may be provided as part of a CM Database.

According to a further aspect of the present invention a computer-readable medium may be provided, in which a computer program is stored, which, when being executed by a processor, may be adapted to control or carry out a method according to the invention.

According to an aspect of the present invention a method may be provided of operating a network by utilizing a SON Verification Function. The method may comprise providing post action verification parameters to the SON Verification Function.

The SON Verification Function may perform tasks of a SON verificator, i.e. it performs post-action verification. This function continuously monitors the CM changes made by other SON functions, analyses PM and FM data and in the case of an undesired network behavior it tries to identify the responsible CM change. Furthermore, it behaves like a typical SON function: it asks the coordinator for permission before suggesting and changing any CM configuration. Thus, the coordinator is able to treat the verification function with high priority and block other SON functions trying to modify the same CM parameters for a given impact area.

Moreover, it is proposed a Diagnosis and Dynamic Impact Area (DDIA) mechanism for SON Verification. This mechanism may comprise of components, such as: a SON Function ID and Objective (SFIO) storage (as part of the CM database), a SFIO module (as part of any SON function), a DDIA module (as part of the SON verification function), and a Verification Impact Area Interpreter (as part of the SON coordinator).

The SON coordination concept performs a pro-active identification of conflicts between SON function instances and supports both algorithm execution and action execution coordination. In addition, internal efforts have been made to specify and implement a post-action SON verification mechanism which analyses KPIs, runs an anomaly detection algorithm and reverts the CM changes that caused an undesired behavior.

In the following, the exemplary solutions to several problems to be solved are given.

Problem:

Uncoordinated CM undo operations cause conflicts and prevent a flawless network operation.

Solution:

The SON Verification Function resembles a typical function (like MRO or MLB), i.e. may include a monitoring, algorithm execution and action execution phase.

The SON Verification Function may support both algorithm and action coordination. In other words, it may be able to generate algorithm execution as well as action execution requests.

The coordinator may receive requests from the SON verification function, i.e. the coordinator may be able to process requests from such a function with high priority and may keep state for that function.

After receiving a request from the SON Verification Function for a set of NEs, the coordinator may be able to reject other configuration requests for the given impact area.

During the action execution phase the computed CM parameters may be applied and the corresponding impact area may be blocked by the SON coordinator for a certain period of time.

Problem:

SON Functions do not have sufficient knowledge for post-action verification.

Solution:

The monitoring part of the SON Verification Function may have access to all CM/PM/FM data The SON Verification Function may have a training phase. The monitored NEs have to perform well during this phase.

The operator should also be able to manually feed the function with statistical data required by the verification algorithm.

The SON Verification Function may comprise profiles which define the kind of anomaly that is targeted. They define whether and how CM/PM/FM data is analyzed. In addition, they define the set of input data required for verification and rules how KPIs are aggregated.

The verification algorithm used during the algorithm execution phase may diagnose which CM parameters have to be reverted. This may be done by observing the CM/PM/FM history. The verification algorithm may compute a configuration that includes CM settings made at a previous point in time.

Problem:

SON functions cannot (and should not) correct CM changes for parameters that are out of their scope.

Solution:

By definition, the SON Verification Function may be allowed to manipulate all CM parameters.

The SON Verification Function may comprise a property for analyzing all CM data for a given set of NEs and may be able to generate a configuration request involving all CM parameters.

Problem:

A post-action verification mechanism may be seeded with inaccurate information.

Solution:

The SON Verification Function may act like a typical SON function, i.e. it generates a request (algorithm and action). Upon reception of the corresponding acknowledgement, the SON coordinator may treat the function with the highest priority, thus preventing other functions of changing any CM settings for the monitored area.

Problem:

The SON verification function assumes that the most recent set of configuration changes for a given network area have caused the detected anomaly/performance degradation.

The SON verification function assumes that reverting the most recent CM changes is the appropriate response action.

The SON verification function may hinder a SON function from achieving its objective by interrupting a transaction.

Solution:

The SFIO storage allows the SON verification function to identify which SON function has changed a given CM parameter and "how far" the function is from achieving its objective.

The SFIO storage as well as the CM database keeps history records, i.e., the SON verification function is able to analyze the history of the CM changes as well as the satisfaction values reported over time.

The combination of a timestamp (provided by the CM database), CM parameter value and satisfaction value allows the SON verification function to determine whether it will interrupt the transaction of another SON function.

Problem:

The SON verification function may violate the granularity of a CM undo operation which can lead to performance degradation.

Solution:

The proposed dynamic impact area determination mechanism for SON verification depends on the actual CM change.

The proposed dynamic impact area determination mechanism addresses each node (e.g., a cell) affected by a CM change.

The SFIO storage gives the required information about which SON function has changed which CM parameter on which node (e.g., cell). The SON verification function can, therefore, correlate CM changes.

Problem:

The SON verification function is not able to dynamically adapt the impact area of the requested CM undo operation.

The usage of a large verification impact-area (defined at design time) may unnecessary prevent SON functions from running at neighboring cells.

The usage of a small verification impact-area (defined at design time) may lead to SON function conflicts.

Solution:

The SFIO module determines at run-time the CM change area.

The DDIA module converts the CM change area into a verification impact area which is sent to the SON coordinator.

The Verification Impact Area Interpreter, located at the SON coordinator, takes the existing coordination rules, applies the reported verification impact area and takes a decision whether the undo request shall be granted.

In the following, exemplary use cases are given.

Verification of the changes made by "black-box" SON functions

The automation of mobile networks requires the usage of proprietary SON functions that have been developed by probably more than one vendor. An operator is able to adjust the settings of a function (e.g. setting a threshold) but does not have the ability to extend the functionality in any way. This means that an operator cannot add a verification mechanism to any of the used functions. The alternative solution would be to deploy a separate post-action verification mechanism. Unfortunately, he will immediately experience the problems stated above. The deployed SON functions are unaware that a SON verificator is running in the background, probably making changes to the same CM parameters they are currently modifying. The proposed SON Verification Function would eliminate those problems since it is able to track all CM changes, identify inappropriate configurations and revert them.

Blacklist Unnecessary Configuration Changes

In case the SON Verification Function makes use of another invention, namely the SON operation diagnosis mechanism, which allows to trigger alarm events to the SON coordinator, it may inform the coordinator about unnecessary changes that are repeated over time. This alarm shall identify the wrong CM decisions and the affected NEs. Upon reception of such an event, the SON coordinator shall reject certain or all requests (algorithm execution/action execution) for the given NEs.

The SON Verification Function may achieve this task using profiles. They define the kind of anomaly that is targeted and how CM/PM/FM data is analyzed. In addition, they can be specified and adapted by the operator.

Automated and Fast Detection of Significant Performance Degradation

Automation and a high speed of detection require that the functionality is realized by machine, without a human being-involved in the actual detection process. Assessing performance degradation in a certain network area requires expressing domain-wide performance in some aggregated form. The SON Verification Function has been proposed to detect such negative changes in performance. It achieves its task by observing CM/PM/FM data reported by the network or a set of NEs. Detection of performance degradations requires that the verification function is aware about what is considered to be "normal" by the (human) network operator. This requires either some input to the system (threshold normal/abnormal) or some machine-level functionality to characterize the normal state based on historical data of the network resource or similarity between network resources. This is achieved by offering profiling capabilities.

Coordinated and Automated Verification

As verification is a post-action procedure, i.e. after certain CM changes have put into effect, an obvious action is to automatically undo the CM changes, which have been executed in the considered network area and the considered time interval. These changes are not manually performed by a human network operator and, therefore, do not prerequisite specific knowledge. An administrator, does not need to know how the remaining SON functions achieve their task in detail in order to perform post-action verification.

In addition, the requested CM changes are coordinated by a SON verificator, i.e. no conflicts will occur and the verification algorithm will be seeded with accurate data.

Efficient Multi-Vendor Operation

For the particular case that per-vendor proprietary verification functions as well as a standardized coordinator exist (see FIG. 6 and FIG. 7) (which basically corresponds to the state of discussion in 3GPP SA5), the invention solves the problem of multi-vendor verification in an efficient way in that verification actions which have some significance beyond a single domain are exposed to the SON coordinator. The SON coordinator then aligns potentially contradicting/competing verification actions based on its usual multi-vendor coordination logic.

Implementation

There may be several possible ways of implementing the SON Verification Function, two exemplary ways are as follows:

1. A SON function may implement the complete verification logic.

2. A simple undo function which forwards algorithm/action requests from an attached SON verificator to the SON coordinator may be utilized. This verificator may have access to CM/PM/FM data and may implement a detection and a diagnosis mechanism. Moreover, it may support profile selection and may be able to decide on its own whether a training phase is required. This particular phase may be repeated over time.

SFIO Storage

Usually, an entry in the CM database comprises several fields, each describing a property of a cell (or NE in general). Examples for such data fields are the current antenna tilt degree, transmission power, HC offset, upper/lower RSSI threshold, etc. A SFIO storage may keep additional information when a CM parameter is changed. First, it may identify the SON function that has triggered the change of a CM parameter. Second, it may store a "satisfaction value" which reflects "how far" a SON function is form achieving its objective before changing the CM parameter. For example, the stored value can be normalized so it ranges within the interval [0, 1], where 0 means that the objective cannot be met and 1 that the SON function has achieved its goal. The SFIO storage 25 may be located at the CM database 26, as shown for example in FIG. 8.

SFIO Module

A SFIO module 24 as illustrated for example in FIG. 8 may be an extension to each SON function 10, including the SON verification function 20.

For a regular SON function 10, it may serve for reporting a SON function's ED and its satisfaction value to a SFIO storage 25 when the function performs changes to CM parameters. Since this module may be part of a SON function 10 it may have direct access to the function's algorithm component. Therefore, it can evaluate "how far" a function is from achieving its objective when it makes adjustments to CM parameters.

In relation to the SON verification function 20, the SFIO module 24 may perform two additional tasks when a CM change occurs. One task may be to compute the CM change area and to trigger the verification algorithm by passing the result of this computation. Another task may be to determine for the CM change area which SON function has performed the parameter modification and "how far" it was from achieving its objective (in case the CM adjustment has been induced by a SON function at all). As illustrated in FIG. 8, the outcome of the last task may be forwarded to the DDIA module 21.

DDIA Module

The DDIA module 21 as illustrated for example in FIG. 9 may comprise two sub-modules: a Verification Impact Area Generator 23 and a Diagnoser 22. The purpose of the Verification Impact Area Generator 23 may be to compute the verification impact area, i.e., the impact area of the CM undo request. The Diagnoser 22 may identify the CM change that caused the significant change in performance. The term "node verification" may be understood as the process of evaluation whether a network node experiences a drop in performance and, therefore, may have not the ability to offer or continue to provide a certain service (such as providing a certain quality of service level). A "node" may be a single cell, a sub-cell part, a set of cells, an eNodeB, etc. Moreover, one node may be a cell operating on a given frequency or Radio Access Technology (RAT) and another node may be the same cell operating on a different frequency or RAT.

Verification Impact Area Generator

The module of the Verification Impact Area Generator 23 may compute the verification impact area as the union of the CM change area and a verification margin area. The purpose of the margin area is to evaluate not only the nodes directly influenced by a CM change, but also their n th degree neighbors.

As soon as the verification algorithm 27 delivers the performance report for a CM change area, see FIG. 8 and FIG. 9, the Diagnoser 22 may send a request to the Verification Impact Area Generator 23 to calculate the verification impact area.

In FIGS. 13 to 16 It is supposed that thirteen cells are present: nine of them are macro cells (cells 1-9), two of them are micro cells (cells 1' and 8') and two of them are pico cells (cells 2' and 5'). Furthermore, the neighborships may be given by the existence of HO associations between the cells. Based on this information a verification graph may be constructed, as shown in FIG. 15. In FIG. 15, the nodes are either macro, micro or pico cells, whereas the edges represent the neighborships between the cells, as defined in the CM database.

Moreover, it is assumed that the MLB function changes a CM parameter of cell 4. The SFIO module of the SON verification function will compute that the CM change area includes not only cell 4, but also all direct neighbors (cells 2, 3, 5 and 6). Furthermore, the above mentioned verification margin may be equal to 1, which means that the verification impact area additionally includes cells 1, 2' 5' and 7 (the first degree neighbors of the cells impacted by the MLB change). A visual representation is given in FIG. 16. The verification margin may be a parameter that can be predefined by a vendor. Moreover, it can be manually overwritten by the operator.

Diagnoser

Once the verification function algorithm 27 has raised an alarm after analyzing the network performance, the Diagnoser is activated to perform an in-depth investigation based on PM, CM and FM data.

Similarly to advanced diagnosis in self-healing establishing detailed symptom—cause (fault) relationships such concepts can also be applied in SON verification. The Diagnoser 22 is focused on comprehensive analysis of large sets of PM, CM and FM data, rather than acquiring and using human-level knowledge. It can be achieved by collecting information about the following items:

Worst performing cells: create a report that may collect the list of worst performing cells.

Worst performing PIs: create a report that generates the list of PIs that are having the highest share in the degradation.

PI pattern analysis: there can be several root causes for detecting network performance degradation, each of which might manifest in different set of PIs being degraded. From this perspective, a certain root cause can be considered as a certain PI-pattern.

Furthermore, the connection to the SFIO module 24 may allow the diagnosis component to have an up-to-date view of the CM changes. Since the SFIO module 24 has access to the CM database 26, the Diagnoser 22 may be able to view the delta between the current CM setup and any CM setup made in the past. Moreover, the SFIO module 24 may have also access' to the SFIO storage 25 which allows the Diagnoser 22 to identify whether a SON function 10 and which one has made the CM changes. The satisfaction values allow the Diagnoser 22 to determine whether a SON function 10 is currently within a CM change transaction or not.

Once the values of the CM parameters requiring an undo are determined, an undo execution request is sent to the SON Coordinator 29.

Verification Impact Area Interpreter

Since the impact area of the SON verification function 20 actually depends on the type of the CM parameters it is reverting, it is a preferable feature of the verification to be able to inform the SON coordinator 29 about the impact area of a CM undo request. In order to support such dynamic impact area definitions, the SON coordinator 29 may be extended with a Verification Impact Area Interpreter. The purpose of this Verification Impact Area Interpreter module is to take the existing coordination rules, apply the reported verification impact area by the SON verification function 20, sent altogether with the undo execution request, and take a decision whether the request shall be granted.

Automated and fast detection of significant performance degradation in a certain network area may be performed as follows:

"Automated and fast detection performance degradation" may require that the functionality is realized at the machine-level, without a human being involved in the actual detection process.

Assessing "performance degradation in a certain network area" may require expressing domain wide performance in some aggregated form. Therefore, several KPIs (or PIs) are aggregated which highlight this "higher than usual" temporal and spatial level of aggregation.

Since the "certain network area" can be dependent on a number of aspects (operator policy, configuration change pattern, etc.) managing the considered scope of the aggregated KPIs (or PIs) evaluation may be of advantage. The introduced verification impact area may address these aspects.

SON Function-Aware Diagnosis

Any closed-loop verification system making decisions may comprise by definition a "diagnosis" component, which reasons on the detected event/incident patterns. However, such systems do not distinguish between CM changes made by a SON function and such made by the human operator itself. Moreover, they do not try to determine the impact of a CM change made by a SON function and do not take into account whether a SON function is within a transaction or not. Therefore it is provides a SON Function-Aware solution which prevents a SON function from being interrupted by an undo operation as it tries to achieve its objective. In addition, our solution prevents partial undo operations from being executed.

Dynamic Impact-Area Awareness

The ability to dynamically change the impact area at run-time has benefits not only for the SON verification function 20, but also for the whole SON coordination concept. The verification impact area interpreter can be built in a generic way, so it allows regular SON functions to specify the impact area within an execution request as well. This would make it possible for a function to inform the SON coordinator that it has, for example, changed its function area or that it has changed a certain CM parameter in such a way that is has enlarged the effect area.

Moreover, "dynamic impact-area awareness" can be turned into "dynamic impact awareness" by extending the interpreter in such way so it is not only able to dynamically adapt the impact time, but also the impact time of the SON verification function. The adaptation of the impact time can be based on the type of CM parameters the SON verification function is adjusting.

Automated Action

As verification happens "post action", i.e., after certain CM changes have put into effect, a preferred action is to automatically undo the CM changes, which have been executed in the considered network area and the considered time interval. Other potential actions are to generate alarms to be followed up by some other application or to generate trouble tickets to a human operator.

SON Coordinator Independence

The SON verification approach is not dependent on the availability of a SON coordinator 29. In case the SON system 100 does not include a mechanism for SON coordination, it is still possible to provide a solution for the above mentioned problems. The described SON verification mechanism would still be able to prevent partial CM undo operations and to distinguish between SON function transactions.

In summary, the proposed approach combines the advantages of a pre-action coordination and a post-action verification mechanism by utilizing a SON mechanism.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims or system type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION OF THE DRAWINGS

The illustration in the drawing is schematically. It is noted that in different figures, similar or identical elements or features are provided with the same reference signs or with reference signs, which are different from the corresponding reference signs only within the first digit. In order to avoid unnecessary repetitions elements or features which have already been elucidated with respect to a previously described embodiment are not elucidated again at a later position of the description.

The drawings illustrate in:

FIG. 17 illustrates an exemplary embodiment of a table with a comparison between SON verification approaches.

DETAILED DESCRIPTION

Figure 1:
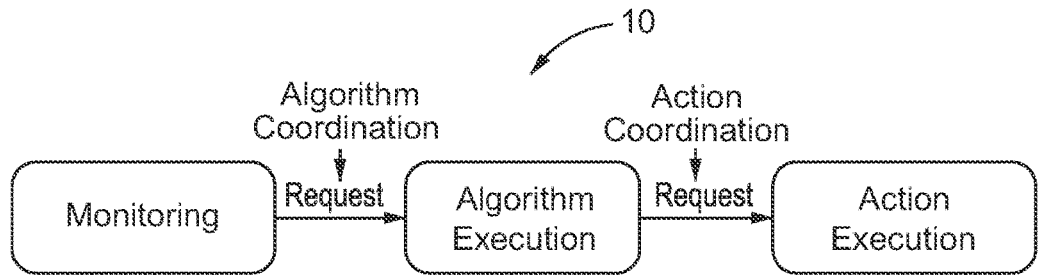
FIG. 1 an exemplary structure of a SON Function in general.
Figure 2:
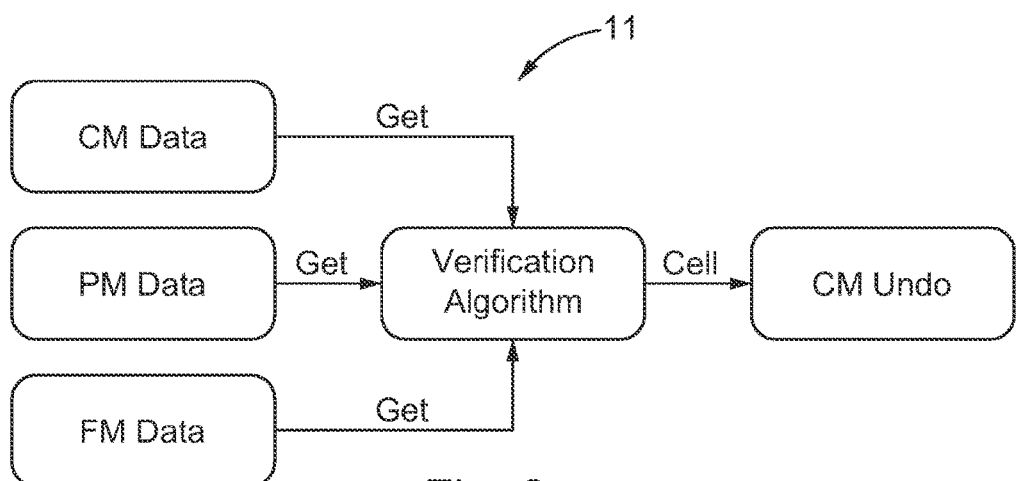
FIG. 2 an exemplary structure of a SON verification mechanism in general.
Figure 3:
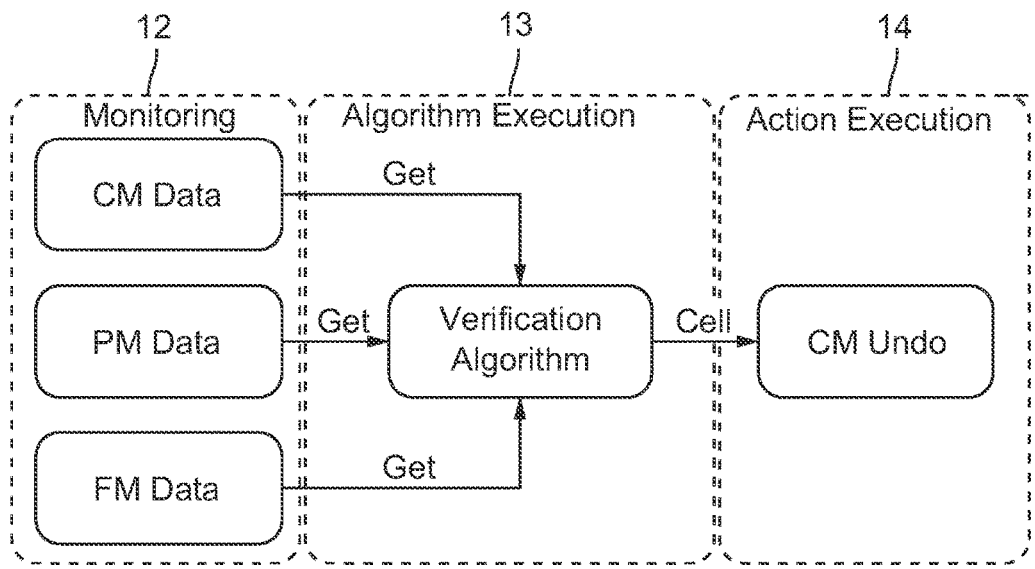
FIG. 3 an exemplary embodiment of a SON verification mechanism represented as a SON Function.

The illustrations in the drawings are schematic. In the following a detailed description of exemplary embodiments is given. In the introduction part FIG. 1 to FIG. 4 were described in relation to some general remarks concerning SON Functions.

Figures 4, 5:
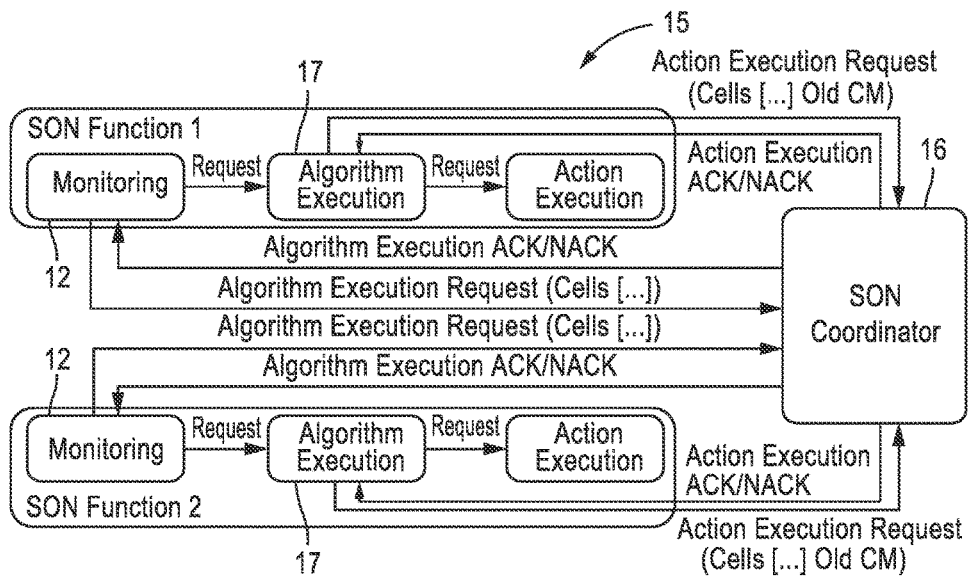
FIG. 4 an exemplary embodiment of a CM Undo realized by SON Functions.
FIG. 5 an example of a comparison between a typical SON Function and an exemplary embodiment of a SON Verification Function according to aspects of the present invention.

FIG. 5 illustrates an example of a comparison between a typical SON Function 10 and an exemplary embodiment of a SON Verification Function 20 according to aspects of the present invention. In particular, exemplary differences between the SON Verification Function 20 and other SON functions 10 are illustrated in FIG. 5.

Regarding the impact area and the activity scheme the verification function resembles a typical SON function. The impact area of a verification function is defined by the corresponding Function-Area, Input-Area, Effect-Area and Safety-Margin. As for the activity scheme, the function's monitoring part may be triggered by a special event, at periodic time intervals or be continuously analyzing.

The data input and the output is where the differences can be found. The SON verification function may analyse all CM parameters and may be able to change each one of them.

Figure 6:
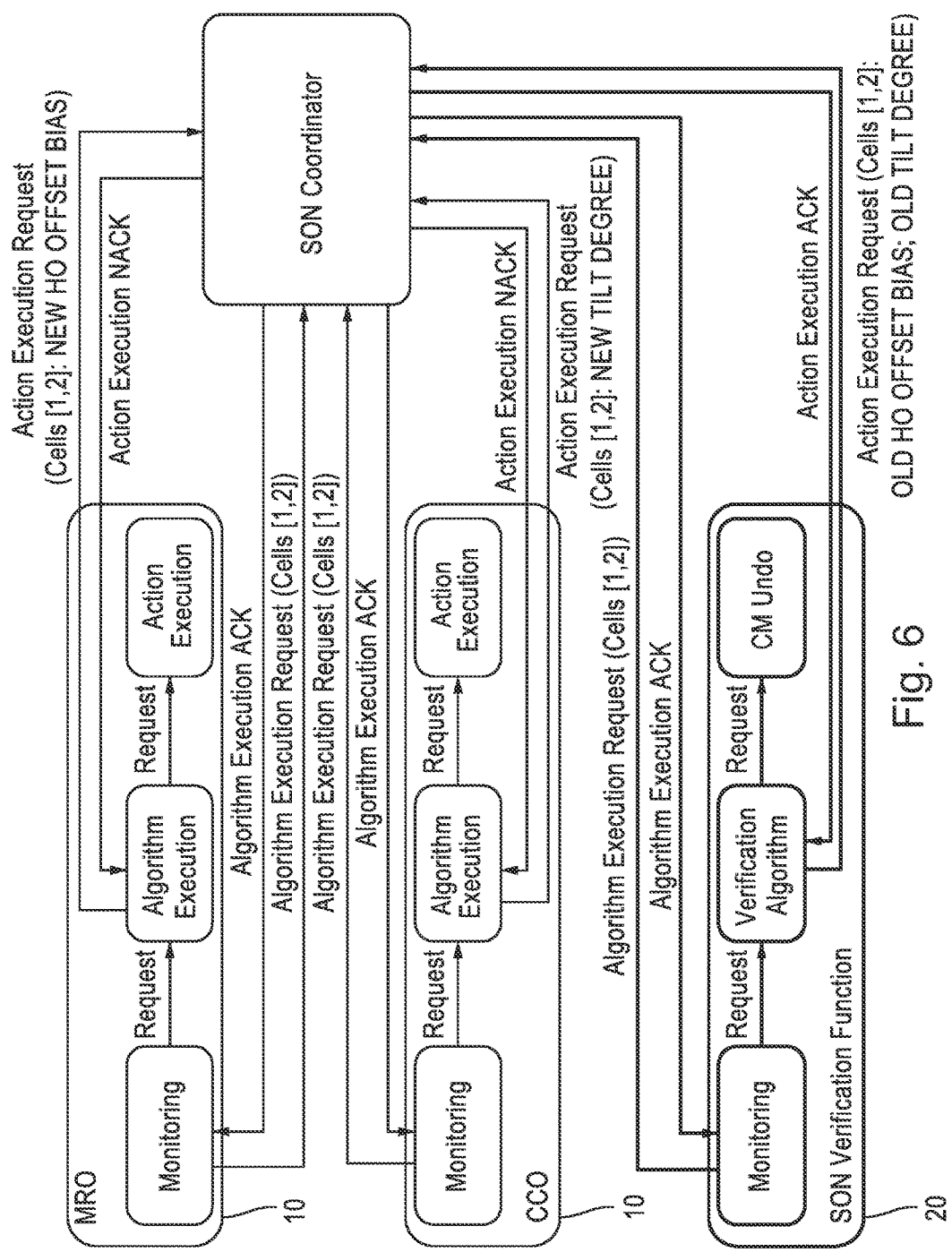
FIG. 6 an exemplary embodiment of a SON Verification Function of the present invention.

FIG. 6 schematically illustrates an exemplary embodiment of a SON Verification Function 20 according to the present invention. In particular, FIG. 6 illustrates a possible interaction between the SON Verification Function and other typical SON functions 10. In this example these functions are MRO and CCO. In addition, it is assumed that the activity scheme of both functions 10 is set to continuous mode, i.e. they continuously monitor the network as defined by the input-area and try to fulfill their tasks. For simplicity reasons, it is assumed that the input-area comprise a first cell 1 and a second cell 2.

In the scenario of FIG. 6 it is supposed that CCC makes a wrong decision by changing the tilt degree of both cells in such a way that a coverage hole occurs, i.e. radio link failures will begin to occur which will result in performance drops. Since MRO only monitors HO related parameters, it will not notice that CCO made a wrong decision and may continue optimizing HO CM settings (the HO OFFSET BIAS in our example scenario.

Nevertheless, the SON Verification Function 20 will detect this undesired network state by observing the PM data and analyzing the CM changes that have been triggered by MRO and CCO. Therefore, it sends and algorithm request which shall be treated with high priority by the SON coordinator, i.e. request from MRO and COO for the given impact area are rejected after receiving an algorithm execution request. As soon as the verification function receives an algorithm execution acknowledgement, it diagnoses the inappropriate CM change and sends a request for action execution. The CM changes are reverted as soon as the coordinator sends the corresponding action execution acknowledgement.

Figure 7:
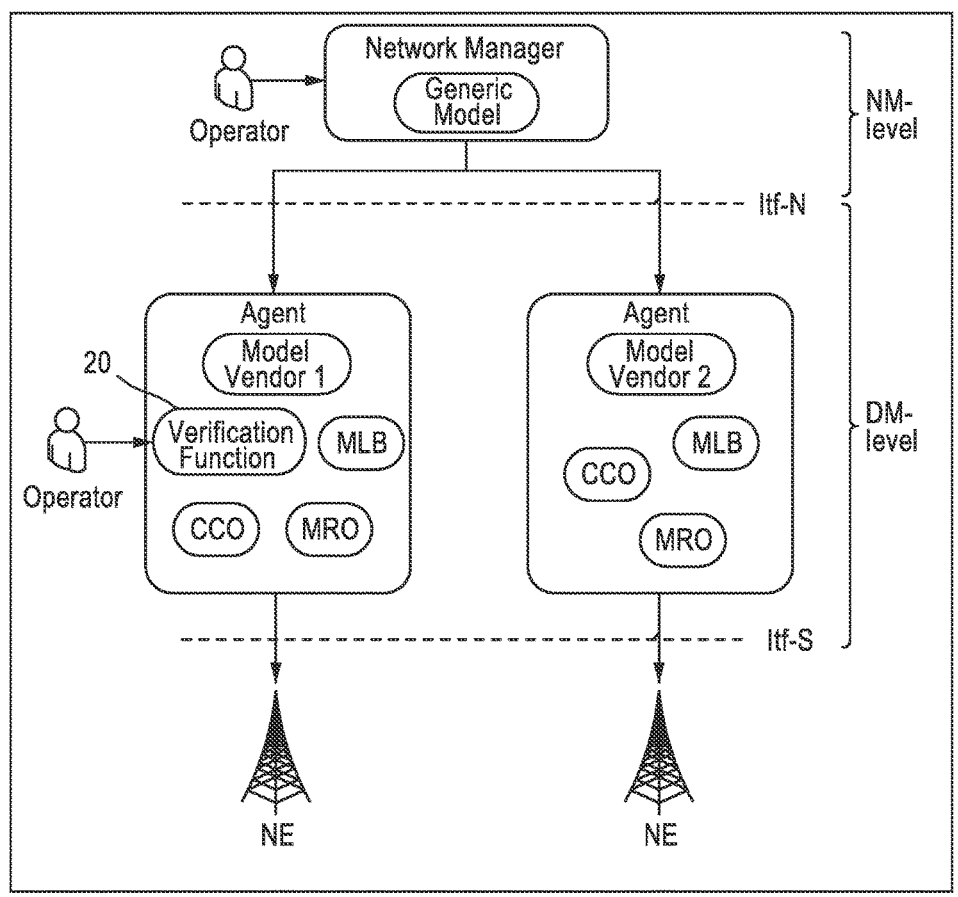
FIG. 7 an exemplary embodiment of an deployment of a SON Verification Function of the present invention.

FIG. 7 illustrated schematically an exemplary embodiment of an deployment of a SON Verification Function 20 of the present invention.

Figure 8:
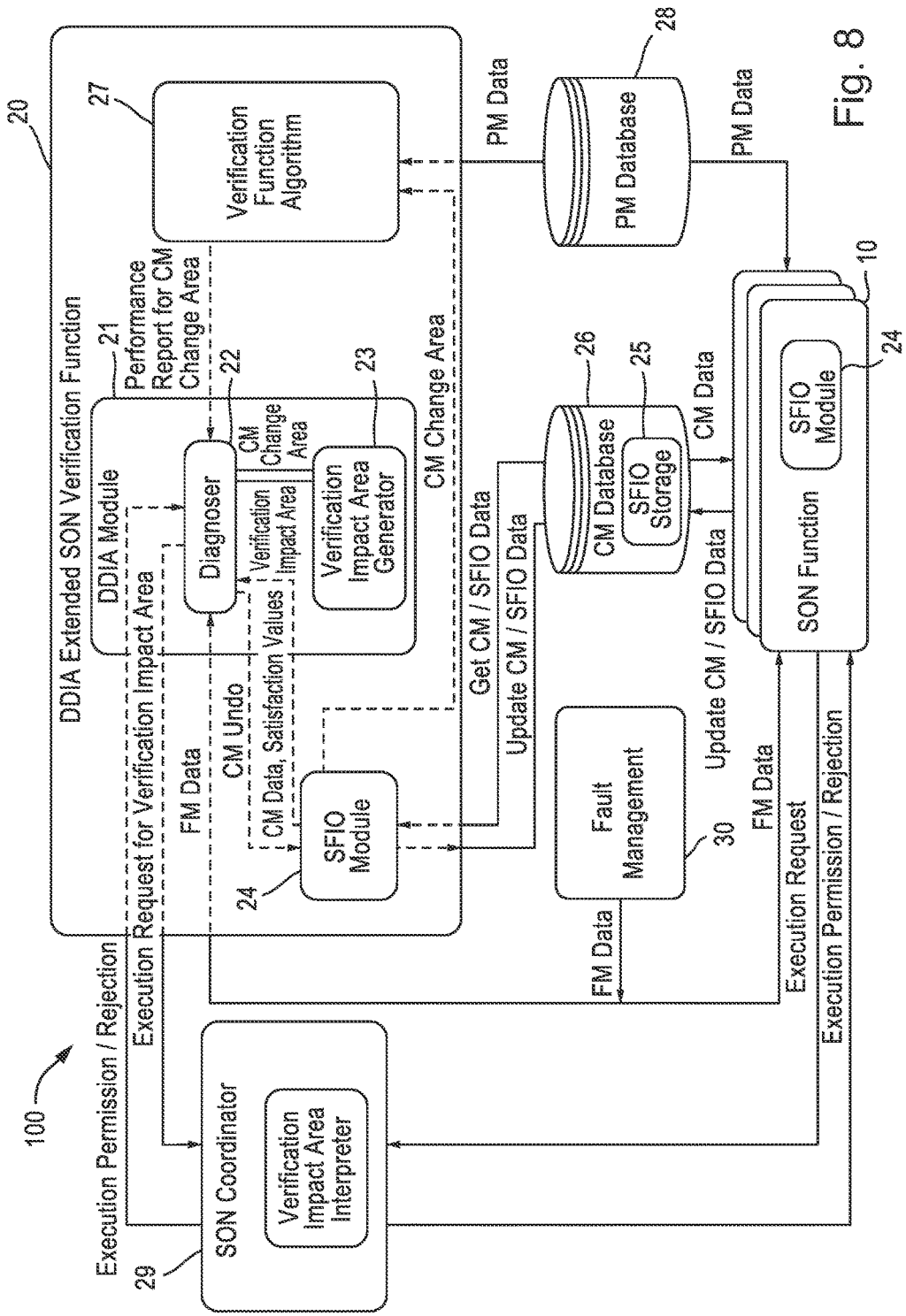
FIG. 8 schematically an overview of an exemplary embodiment of a DDIA extended SON verification function.
Figure 9:
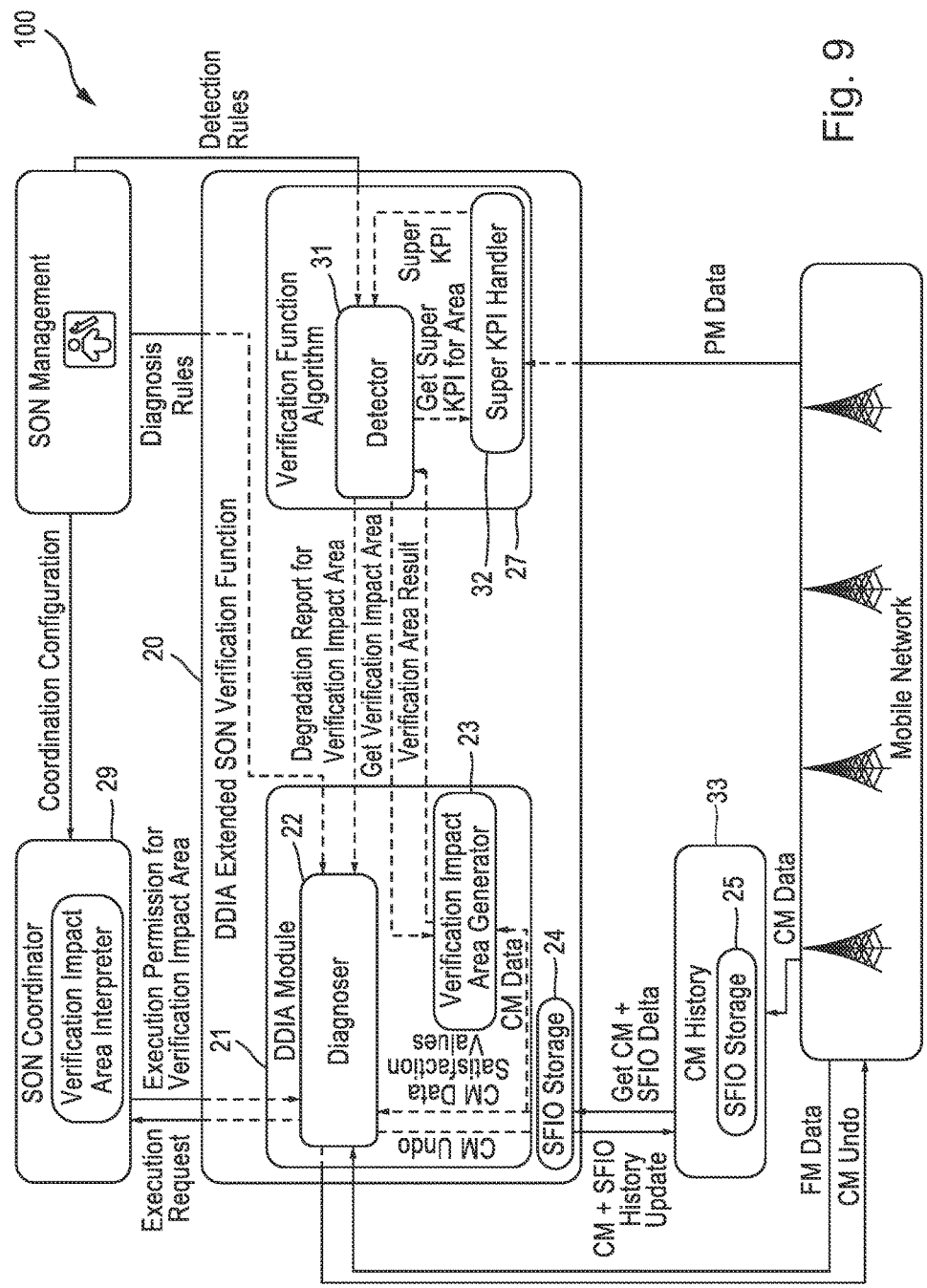
FIG. 9 the mechanism of FIG. 8 with more details.

An overview of a exemplary embodiment of a DDIA extended SON verification function is illustrated in FIG. 8 and FIG. 9. FIG. 8 illustrates an exemplary embodiment of a SON Verification Function 20 of the present invention in a network system 100 or a network 100. FIG. 9 illustrates the exemplary embodiment of the SON Verification Function 20 in more details. The SON Verification Function 20 comprises a DDIA Module 21 and is called a DDIA Extended SON Verification Function. The DDIA Module comprises a Diagnoser 22, which interacts with a Verification Impact Area Generator 23. Moreover, the Diagnoser 22 has an interface to a SFIO Module 24 in order to be connected with a SFIO Storage 25 of a CM Database 26. Furthermore, the SON Verification Function 20 comprises a Verification Function Algorithm 27, which may receive PM data of a PM Database 28. The PM Database 28 is connected with further SON Functions 10 comprising a SFIO Module 24. The SON Functions and the SON Verification Function 20 are adapted to be connected with a SON Coordinator 29, respectively. Moreover, the network system 100 comprises a Fault Manager 30, which provides FM Data to the SON functions 10 and to the SON Verification Function 20.

Figure 10:
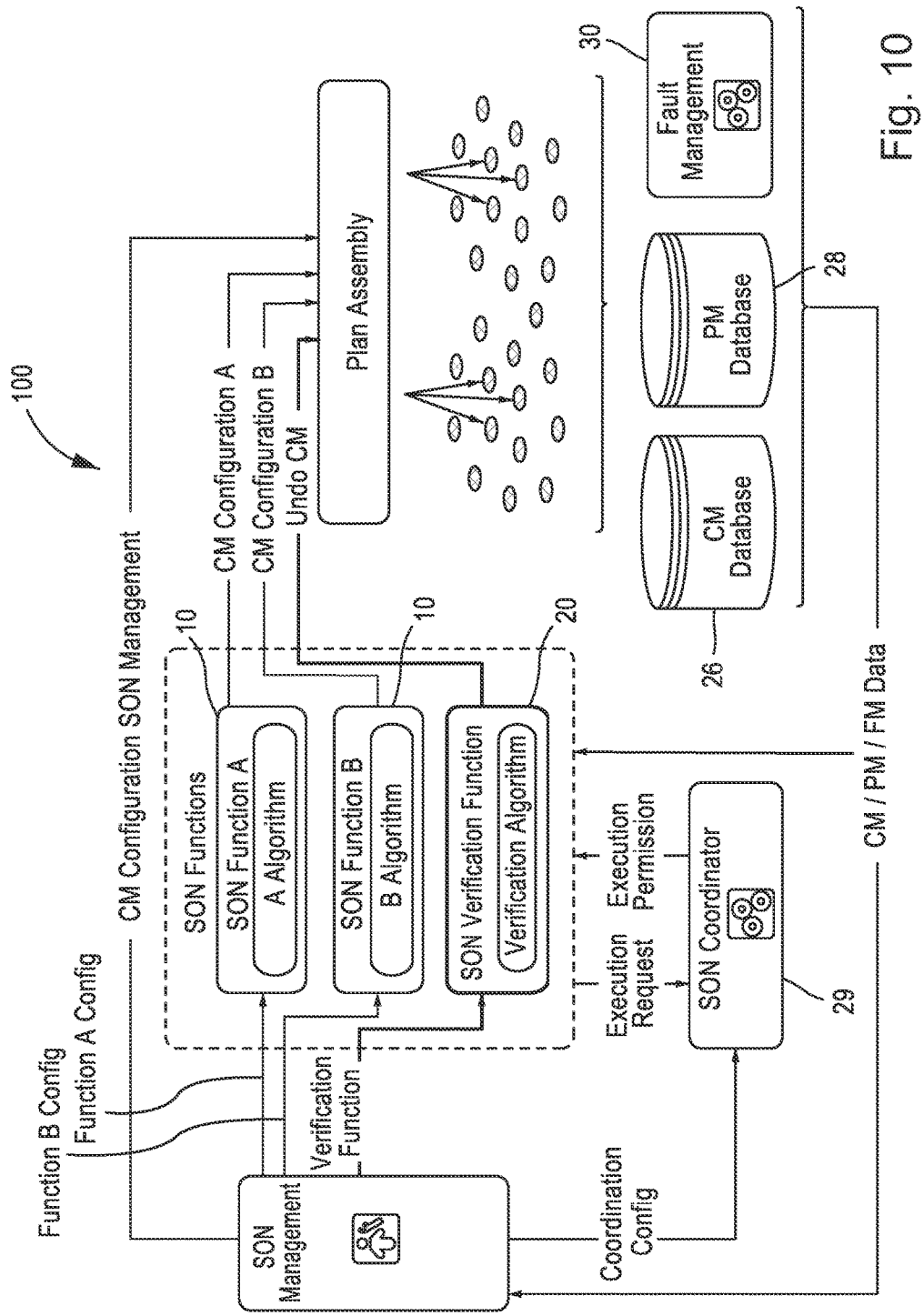
FIG. 10 an exemplary embodiment of a SON Verification Function in a network.

FIG. 10 illustrates an exemplary embodiment of a network system 100 comprising SON Functions 10 and one SON Verification Function 20. FIG. 10C illustrates a further exemplary embodiment of an integration of a verification mechanism. The mechanism is implemented as a SON verification function 20 comprising CM data, Performance Management (PM) data and Fault Management (FM) data from the corresponding databases 26, 28, 30 in order to achieve its task. As soon as enough data is collected, the SON verification function 20 tries to determine whether the network experiences performance degradation. If this is the case, it sends an undo execution request to the SON coordinator 29 and it reverts the most recent CM changes of the affected cells after receiving the corresponding acknowledgement. As the figure depicts, a human operator is always informed about the current state of the CM parameters, KPIs as well as fault occurrences in the network. The operator is also able to manually adjust CM parameters.

There are several problems with the introduced verification approach which exemplary embodiments of the present invention address.

A first aspect is that the SON verification function 20 assumes that the most recent set of configuration changes for a given network area and time interval have caused the detected anomaly. That means that an assumption is made that reverting the most recent CM changes is the appropriate response action.

Figure 11:
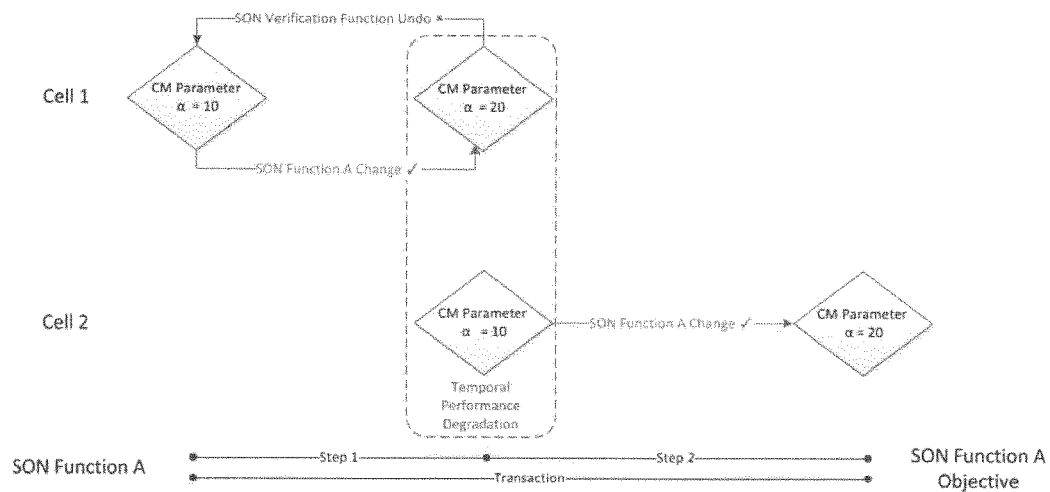
FIG. 11 an exemplary embodiment of an integration of a verification mechanism.

While this procedure may be fine and, e.g., in SON self-healing applied for simple, basic sleeping cell treatment (directly triggering cell resets for detected cells in outage), there are cases where this assumption is not necessarily true. It may be supposed that there two cells as shown in FIG. 11 located within the function area of SON function A. In addition, let us assume that SON function A is only able to achieve its objective after performing two steps within a single transaction. During the first step it changes the CM parameter $\alpha$ of cell 1 from 10 to 20. During the second step it performs the same change, but on cell 2. If the SON verification function interferes between the two transactions (e.g., due to a temporal performance drop or anomaly) and reverts the CM parameter $\alpha$ of cell 1, it will prevent the SON function of achieving its objective. Therefore, the SON verification function should be able to take such multiple steps into account, i.e., it should be able to differentiate between transactions.

FIG. 9 shows how the components are connected with each other and how the message flow between them is executed. The SON Verification Function 20 itself may comprise the following components: (1) a Super KPI handler 32, (2) a detector 31, (3) a SFIO module, (4) a verification impact area handler 23, and (5) a diagnose 22. The first two modules build the DDIA module 21 whereas the latter two construct the algorithm component 27 of the SON verification function 20. The Super KPI handler 32 has to manage all implemented Super KPIs. A Super KPI is an aggregation of several performance indicators. Furthermore, training can be applied. The training defines reference states from which a performance indicator may deviate, causing an increased anomaly level. If the anomaly levels are aggregated, the result becomes a Super KPI.

Before performing the actual computation of a Super KPI, the corresponding handler needs to know which set of cells it has to evaluate. For this reason, the verification impact area 23 handler may be contacted, whose purpose is to supply the Super KPI handler with the area that needs to be monitored.

As it can be seen in FIG. 9, the Super KPI handler 32 may be not directly connected with the verification area handler. Instead, their communication may be managed by the detection module. Based on the output of a Super KPI, the detection module 31 may determine whether a certain network area experiences degradation in performance. It may be also foreseen that an operator additionally define (Super KPI, verification area) pairs.

Any kind of performance degradation information may be then forwarded to the diagnosis module whose purpose is to figure out which CM parameters require an undo. In other words, its task is to determine which CM settings caused the experienced degradation. This may be achieved by the SFIO module 24 which contacting contacts the CM history module 33 and, getting gets the required CM history as well as SFIO information and running the appropriate diagnosis function. Moreover, the mentioned CM history module may include the CM database as well as the introduced SFIO storage 25. Thus, this particular CM history implementation may provide CM parameters and the afore-introduced SFIO information as well. This information may be then forwarded to the appropriate components within the DDIA module.

As soon as the "guilty" CM changes are identified, the SON coordinator may asked for permission before triggering the actual CM undo operation. The verification function also may supply the SON coordinator with the computed verification impact area. Moreover, the human operator may also define diagnosis rules by its own.

Figure 12:
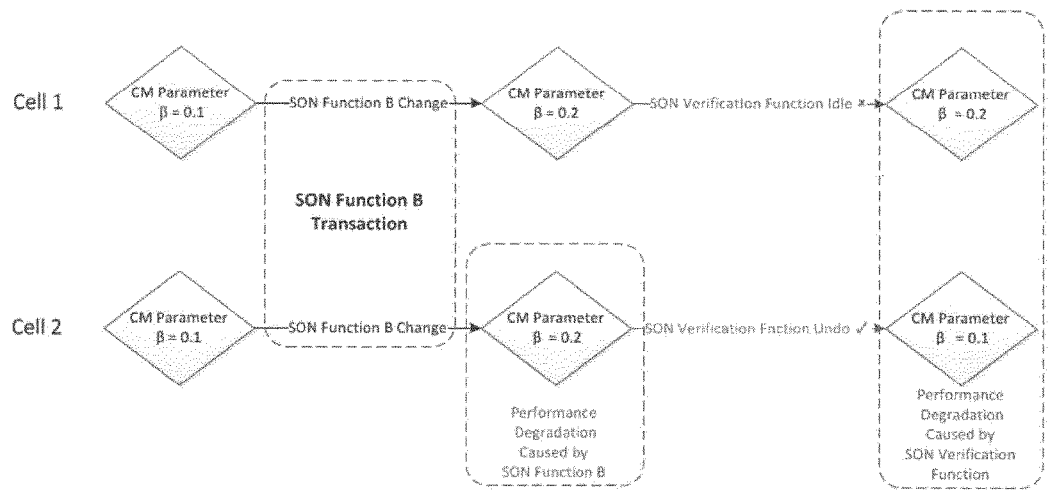
FIG. 12 an exemplary embodiment of an asymmetric execution of an Undo Operation.

Another aspect focus a granularity of a CM undo operation. FIG. 12 illustrate an exemplary embodiment of an asymmetric execution of an Undo Operation. It is supposed in FIG. 12 that cell 1 and 2 are monitored by the SON verification function 20 and are located within the function area of SON function B. Furthermore, it is supposed that SON function B makes one transaction which changes the CM parameter β of both cells to the value of 0.2. In addition, let us assume that because of this change cell 2 starts to experience degradation in performance which leads to a CM undo only at cell 2. Thus, there may occur a situation where parameter 3 has two different values at cell 1 and 2. One example where such a difference of the CM values can have a negative impact is when it is asymmetrically changed the Handover (HO) offset of two neighboring cells. Any asymmetric change of the HO offset bias induces either additional hysteresis or worse: ping-pong handovers.

Figure 13:
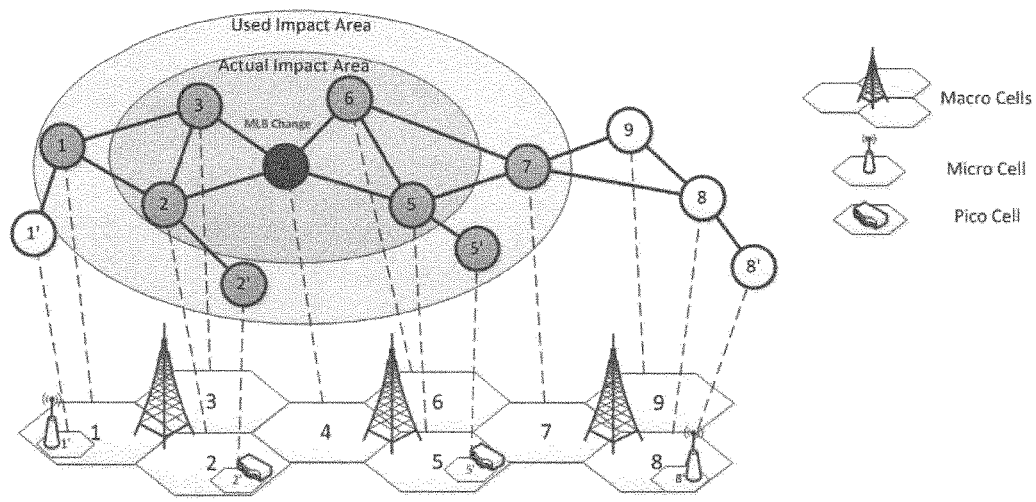
FIG. 13 an exemplary embodiment of a too large impact area.
Figure 14:
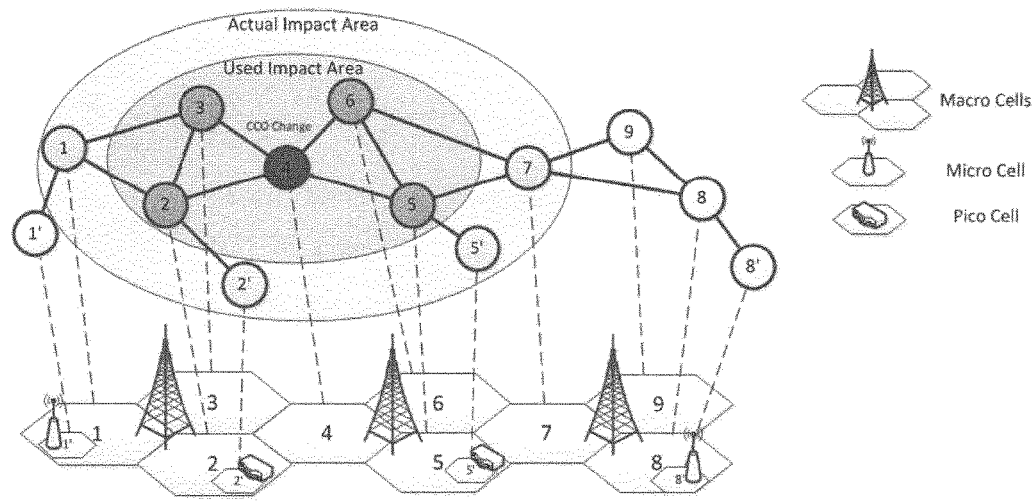
FIG. 14 an exemplary embodiment of a too small impact area.

The other aspect corresponds to the impact area of the SON verification function 20. Since the purpose of this function is to assess the impact of a set of (SON-induced) configuration changes, it is located at the Domain Manager (DM) or even at the Network Manager (NM) level. In this way it can take information from all parts of the (sub-)network into consideration. Moreover, it has the ability to undo all configuration changes made for a NE (or a cell). This would mean that the SON verification function can perform changes to CM parameters that affect not only the target cell (or NE), but also its neighbors. For instance, the parameters adjusted by the Mobility Load Balancing (MLB) function have an effect only on a cell's direct neighbors, whereas the parameters manipulated by the Coverage and Capacity Optimization (CCO) function may have an impact on the second degree neighbors as well. However, if the SON verification function 20 is configured to have the same impact area as the CCO function, it will unnecessary block MLB optimization tasks on the second degree neighbors after sending the corresponding execution request to the SON coordinator. An exemplary embodiment of a too large impact area is illustrated in FIG. 13. If the impact area of the MLB function is used instead, function conflicts may occur in case CM parameters controlled by the CCO function are rolled back as illustrated in FIG. 14.

Figure 15:
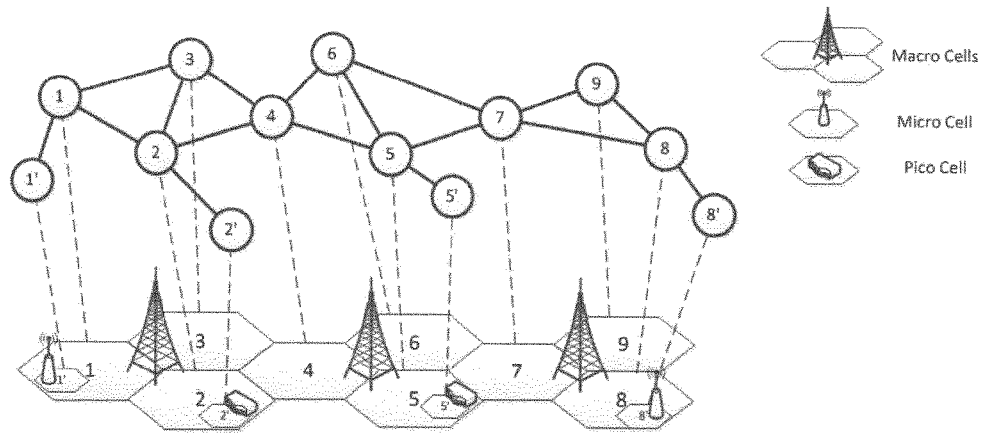
FIG. 15 an exemplary embodiment of a verification graph in a multi cell layer scenario.

FIG. 15 illustrates an exemplary embodiment of a verification graph in a multi cell layer scenario.

Figure 16:
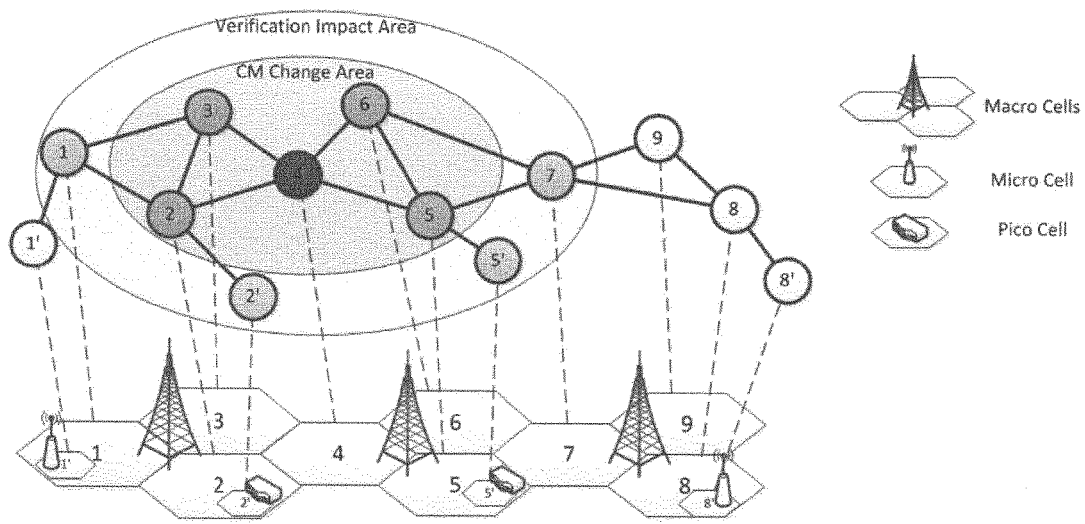
FIG. 16 an exemplary embodiment of a verification impact area.

FIG. 16 illustrates an exemplary embodiment of a verification impact area.

FIG. 17 illustrates an exemplary embodiment of a table with a comparison between SON verification approaches.

In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

List of Abbreviations

ACK Acknowledgement
BSC Base Station Controller
CCO Coverage and Capacity Optimization
CM Configuration Management
DDIA Diagnosis and Dynamic Impact Area
DM Domain Manager
EDGE Enhanced Data rates for GSM Evolution
eNodeB Evolved Node B
FM Fault Management
HetNet Heterogeneous Network
HO Handover
HSPA High Speed Packet Access
KPI Key Performance Indicator
LTE Long Term Evolution
MLB Mobility Load Balancing
NRO Mobility Robustness Optimization
NACK Negative Acknowledgement
NE Network Element
NM Network Manager
NMS Network Management System
OSS Operational Support System
PI Performance Indicator
PM Performance Management
RAT Radio Access Technology
RNC Radio Network Controller
SON Self-Organizing Network
SFIO SON Function ID and Objective

The invention claimed is:

1. A method of operating a network by a self-organizing network (SON) verification function, comprising:
   monitoring change by another SON function of at least one configuration management parameter and performance data of the network;
   observing a performance degradation in the network;
   identifying the change as responsible for the performance degradation; and
   sending an undo execution request to a SON coordinator for reversion of the change
   while blocking another SON function trying to modify the at least one configuration management parameter.

2. The method according to claim 1, further comprising: accessing configuration management data and/or performance management data and/or fault management data.

3. The method according to claim 1, further comprising: changing configuration management data.

4. The method according to claim 1, further comprising: providing a training for the SON verification function.

5. The method according to claim 1, further comprising: determining the degradation in a defined area of the network; and
determining a SON function which has initiated the degradation.

6. The method according to claim 1, further comprising: accessing configuration management history data.

7. The method according to claim 1, further comprising: providing a measure which pre-defines a degradation.

8. The method according to claim 1, further comprising: collecting performance information of a plurality of cells; and
providing a performance indicator pattern for the cells.

9. A SON verification function, which is adapted to perform the method according to claim 1.

10. A network system comprising a plurality of SON functions, wherein at least one of the plurality of SON functions is a SON verification function, which is adapted to perform the method according to claim 1.

11. The network system according to claim 10, wherein the SON verification function has a higher hierarchy compared to the further SON functions.

12. The network system according to claim 11, wherein the SON verification function comprises a diagnoser.

13. The network system according to claim 11, wherein the SON verification function comprises an interface for connecting with a SON coordinator, wherein the SON coordinator comprises a verification impact area interpreter.

14. The network system according to claim 11, wherein at least one of the SON functions comprise an interface for connecting with a self-organizing network function identification and objective storage.

15. The network system according to claim 10, wherein the SON verification function comprises an undo functionality.

16. A non-transitory computer-readable medium, in which a computer program is stored, which, when being executed by a processor, is adapted to control or carry out the method according to claim 1.

* * * * *